US006279411B1

(12) United States Patent
Stoll et al.

(10) Patent No.: US 6,279,411 B1

(45) Date of Patent: Aug. 28, 2001

(54) LINEAR DRIVE MECHANISM

(75) Inventors: Kurt Stoll; Thomas Feyrer, both of Esslingen (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/308,506

(22) PCT Filed: Oct. 4, 1997

(86) PCT No.: PCT/EP97/05456

§ 371 Date: May 19, 1999

§ 102(e) Date: May 19, 1999

(87) PCT Pub. No.: WO98/25032

PCT Pub. Date: Jun. 11, 1998

(30) Foreign Application Priority Data

Nov. 30, 1996 (DE) ............................................ 196 49 718

(51) Int. Cl.[7] .......................... F16H 27/02; F16H 29/02; F16H 29/20

(52) U.S. Cl. .......................... 74/89.38; 74/96; 74/89.39; 384/7; 92/5 R; 92/68

(58) Field of Search ........................ 74/89.15, 89, 89.38, 74/89.39; 92/5 R, 13.5, 85 B, 13.1, 165 R, 165 PR; 384/26, 15, 7

(56) References Cited

U.S. PATENT DOCUMENTS 4,566,738 1/1986 Fasth .................................... 308/3 A
4,686,870 8/1987 Mack .................................... 74/828
5,188,018 * 2/1993 Trenner ................................ 92/5 R
5,193,430 3/1993 Ilgovsky ................................ 92/13.1
5,305,683 * 4/1994 Gosdowski et al. ................... 92/5 R
5,330,272 * 7/1994 Stoll ...................................... 384/26
6,098,517 * 8/2000 Thorwart et al. ........................ 92/68

FOREIGN PATENT DOCUMENTS 0 219 439 A1 4/1987 (EP) .
0 472 778 A2 4/1992 (EP) .
2 566 847 A1 1/1986 (FR) .
52034176 5/1977 (JP) .
61256007 11/1986 (JP) .
WO 92/17321 10/1992 (WO) .

* cited by examiner

*Primary Examiner*—Sherry Estremsky
*Assistant Examiner*—Tisha D. Lewis
(74) *Attorney, Agent, or Firm*—Hoffmann & Baron, LLP

(57) ABSTRACT

A linear drive mechanism comprising a moveably guided output member (12). The output member (12) is guided on a supporting device (15) in a supporting area (13) of the housing (1). A position determining device (54) protrudes laterally from the output member (12). The position determining device moves along a position determining area (55) during the axial movement of the output member (12). The support device (15) extends only over part of the perimeter of the output member (12), wherein the output member (12) is exposed along a section of the perimeter so that an open space (67) is provided, thereby forming part of a position determining area (55) which can be traversed by the position determining element (54). This makes it possible to combine effective guidance with a compact linear drive design.

29 Claims, 6 Drawing Sheets

LINEAR DRIVE MECHANISM

BACKGROUND OF THE INVENTION

1. Field of the Invention

The invention relates to a linear drive comprising a rod-like rotationally locked output drive part guided for axial movement in relation to a housing using a bearing means cooperating with its outer periphery, said bearing means being provided in a bearing portion of said housing, at least one position preset element, extending to the side, being provided on the output drive part, such preset element being shifted on axial movement of the output drive part along a position preset space extending alongside the output drive part.

2. Description of the Prior Art

Linear drives of this type are predominantly utilized in assembly and handling operations and are disclosed for instance in the European patent publication 0 219 439 A1. In this known case an output drive part adapted to be driven by the action of fluid to perform a linear movement is provided, which in a bearing portion lying in the front section of a housing, is encircled by a bearing means and is therefore is guided for movement in the longitudinal direction with lateral support. In order to be able to position the output drive part in a predetermined axial position a laterally projecting position preset element is provided laterally projecting from the output drive part, which runs along a lead screw, which is arranged in a position preset space arranged adjacent to the output drive part. Moreover several sensors are arranged in the position preset space adapted to respond to the position preset element and which cooperate with a brake means associated with the lead screw. If during the axial movement of the output drive part the position preset element draws close to one of the sensors, the brake means will be operated by a brake signal so that the lead screw is locked against rotation and a further axial movement of the position preset element and of the output part connected with same will be prevented.

The section, projecting from the housing, of the output drive part is extremely frequently subjected to high transverse forces during operation. For instance the output drive part may be provided with a gripping means, which is to convey heavy loads. It is furthermore possible for further linear drives to be mounted in order to produce a multi-axial handling system. It is therefore necessary to guide the output drive part in relation to the housing along a relatively long bearing portion and to support it in the transverse direction. This leads to a correspondingly larger overall size of the housing.

OBJECTS AND SUMMARY OF THE INVENTION

One object of the present invention is to provide a linear drive of the type initially mentioned, which while ensuring reliable bearing of the positionable output drive part has a compact overall length.

In order to fulfil this object there is a provision such that the bearing means extends for at least one section of its overall length over part of the periphery of the output drive part and the output drive part is exposed in the bearing portion along a section of the periphery not cooperating with the bearing means so that in the bearing portion to the side adjacent to the output drive part there is a free space extending in its longitudinal and peripheral direction, such free space constituting a component, which is available for motion of the position preset element, of the said position preset space.

This means that there is a linear drive, in the case of which the axial shift path available for the position preset element extends into the bearing portion. The axial movement of the position preset element is hence no longer limited by the start of the bearing portion. The position preset space, into which the position preset element extends, and along which such position preset element is moved during the linear movement of the output drive part, is now at least partly extended to include the bearing portion, because the bearing means provided there only extends over a part of the periphery of the output drive part and the output drive part is exposed along a section of the periphery located in the path of movement of the position preset element so that there is a free space in the bearing portion, wherein the position preset element may move without hinderance. The position preset element may therefore be shifted past the effective bearing means into the bearing portion. There is accordingly the possibility of selecting a comparatively long axial bearing portion without thereby overly increasing the overall length of the position preset space, since the position preset space and the bearing means may overlap axially without impeding each other.

Further advantageous developments of the invention are defined in the dependent claims.

If the bearing means extends for its entire overall length over only a part of the periphery of the output drive part, it is possible for a free space increasing the overall length of the position preset space to be provided, which occupies the entire length of the bearing portion.

The bearing means is preferably constituted by at least two diametrally oppositely placed and for instance cassette-like bearing units, which on sides, which are diametrally opposite as related to the longitudinal axis of the output drive part, cooperate with the outer periphery of the output drive part for bearing same. Several such pairs of bearing units can be set in positions distributed in the longitudinal direction of the output drive part on the housing.

Preferably the bearing means simultaneously serves for preventing rotation of the output drive part. If diametrally oppositely placed bearing units are present, the output drive part will preferably have a longitudinally extending guide groove in each of the corresponding potions, into which the respectively associated bearing unit fits in an interlocking manner.

The housing of the linear drive is preferably so designed that in cross section it possesses a rectangle-like configuration. In order in this respect to make optimum use of the overall volume, it is an advantage for the free space for the position preset element to move in is so placed in relation to the transverse and vertical axis of the housing that it has an oblique alignment, it facing obliquely to the side and at the same time downward or upward.

Preferably the bearing means is set on a covering body connected with the base.

It is convenient for the bearing means to be set on main body, having a generally L-shaped cross section, of the housing, the peripheral part of the output drive part facing away from the two L-limbs forming the free space, which is preferably covered over by a cover body connected with the main body, such cover body furthermore covering over the position preset space.

In accordance with a convenient form of the invention the position preset element is designed in the form of an abutment, which cooperates with at least one counter-abutment for presetting the position, such counter-abutment being a component of a position preset means arranged in the position preset space. For position presetting the abutment runs up against a counter-abutment arranged in its path of motion.

The counter-abutments present are conveniently arranged on a holding rod extending in the position preset space in parallelism to the longitudinal axis of the output drive part.

Conveniently the counter-abutments are adapted to be adjusted in the longitudinal direction in order to be able to preset the position as required. In order to ensure optimum centering of the acting force, the abutment is preferably so designed that it at least partly fits around the holding rod more particularly in the manner of a fork.

A modification of the position preset is possible without axially resetting the counter-abutments, if the position preset means has at least one counter-abutment, which may be switched over, using an associated switch-over means, between an active position extending into the path of travel of the abutment and an inactive position located clear of such path of travel of the abutment. It is preferred for the switch-over means to cooperate with the holding rod bearing the counter-abutments, positioning of a respective counter-abutment being implemented by turning the holding rod about its longitudinal axis. In this respect it is preferred for the holding rod to be able to be positioned in at least two different angular settings. The number of the selectable angular settings depends to a significant extent on the number of counter-abutments which may be switched over. If in addition to the two predetermined end settings in the case of need a further or single intermediate setting, as for example a center setting, is to be preset, it is sufficient to have one counter-abutment and two selectable angular settings in order to set the counter-abutment selectively in the active or in the inactive setting. In order to preset as greater number of intermediate settings a correspondingly larger number of counter-abutments is provided which may be shifted into the active setting by positioning the holding rod in steps.

In order to reduce the load on the individual components of the linear drive and more especially to prevent jerks, the position preset means is preferably provided with a shock absorber means, which possesses at least one moving damping member, which is kinematically coupled with the holding rod. In this case the holding rod is so movingly mounted that it is able to be moved along a predetermined damping path to a limited extent. In this case the terminal setting of the counter-abutments is preferably so performed that same will assume their position preset setting when the holding rod arrives at the end of the damping path at a permanently settable end position. The damping path is then defined by the distance which is traveled by the counter-abutment, acted upon by an abutment, as far as the said end position. It is in this manner that there will be, irrespectively of which counter-abutment is active, a reliable shock absorbing function, it not being necessary to associate a separate shock absorbing means with each counter-abutment, and in fact it is sufficient to provide a single shock absorbing means cooperating with the holding rod.

The shock absorbing means preferably comprises only two shock absorbers, which are respectively active in one direction of stroke and are more especially located functionally at the two axial end parts of the holding rod. Accordingly for positioning shock absorbers are required able to be set in two or more settings and preferably in only two.

In the following the invention will be described with reference to the accompanying drawings in more detail.

DETAILED DESCRIPTION OF THE INVENTION

Figure 4:
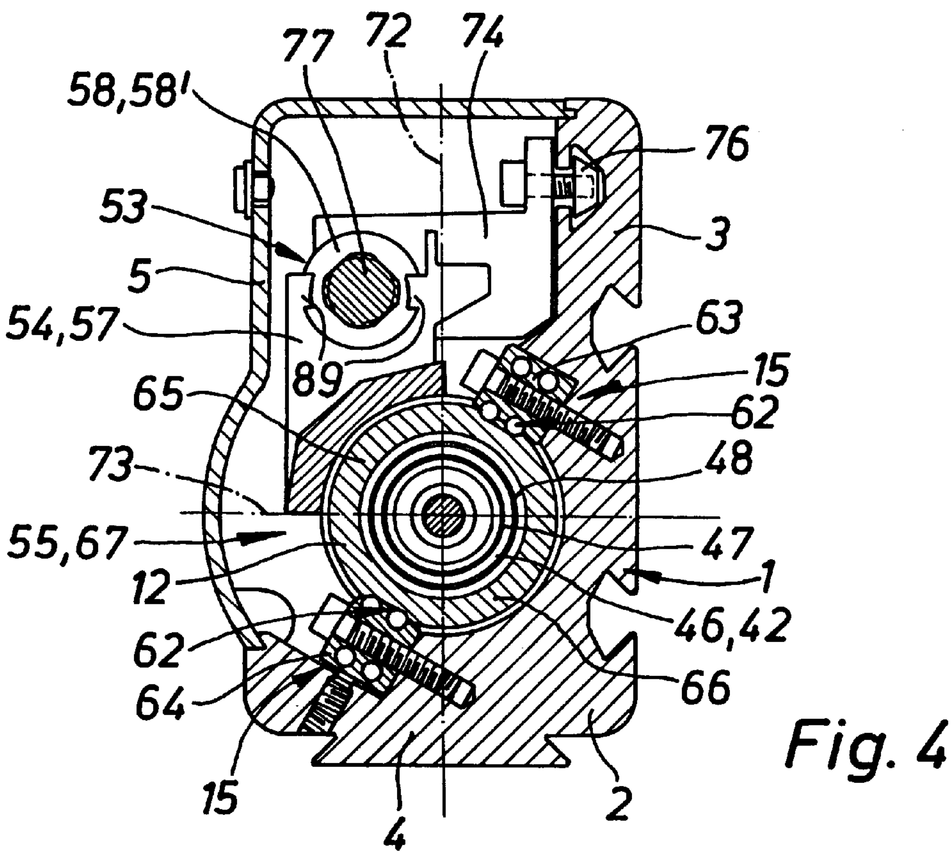
FIG. 4 shows the linear drive of FIGS. 1 and 2 in a cross section taken on the line IV—IV.

The linear drive of the example comprises a housing 1, which possesses a main body 2 extending in the longitudinal direction and as seen in cross section in FIG. 4 with a generally L-like configuration, on which in the portion delimited by the two limbs of the L-like configuration, has a covering body 5 detachably mounted thereon, such body 5 having a similar L-like cross section so that in cross section there is an external shape of the housing 1 which is essentially rectangular. on the two end faces the housing 1 is closed off by a front (6) and a rear (7) terminal wall, the terminal walls 6 and 7 being attached to the main body 2 by means of attachment elements 8, said covering body 5 for its part being detachably secured to the main body 2 and to the two terminal walls 6 and 7.

The linear drive possesses an output drive part 12 able to be moved axially in relation to the housing 1, such output drive part having a rod-like shape and in the example being tubular. The output drive part 12 extends partially in the interior of the housing 1, it extending through a bearing portion 13, which is predetermined in the housing 1, and through a front terminal wall 6, and having an external longitudinal section 14 extending out of the housing 1. The bearing portion 13 is preferably located in the front section, associated with the front terminal wall 6, of the housing 1.

In the bearing portion 13 a bearing means 15 is arranged, which is solid with the housing and which cooperates with the outer periphery of the output drive part, the output drive part 12 only being laterally supported and simultaneously axially guided thereby. The bearing means 15 may conveniently serve furthermore for fixing the output drive part 12 to prevent relative rotation thereof around its longitudinal axis 16 in relation to the housing 1. At the free end of the outer longitudinal part or section 14 a force output element 17 is aranged, which is able to be connected with something to be moved. The means preventing relative rotation ensure a constant angular alignment of the force output element 17 so that the linear drive is more particularly suitable for applications in assembly and materials handling, in which case inter alia articles must be conveyed and positioned with a predetermined alignment.

The output drive part 12 is provided with a fluid operated drive means 18, with whose aid the output drive part 12 is able to be driven to and fro by fluid power axially along its longitudinal axis 16. This drive means 18 is preferably accommodated in the interior of the housing 1.

It is preferred for the drive means 18 to be constituted by a separate fluid operated drive cylinder 22. This cylinder possesses a cylinder housing 21 set in a fixed manner at the back on the rear terminal wall 7 of the housing 1 of the linear drive, such cylinder housing being arranged parallel to the output drive part 12. The attachment to the housing is preferably with the use of a rear terminal body 24, on which the rear end of a cylinder tube or barrel 23 is secured, and which for its part possesses a screw connection 25, indicated in chained lines, or some other type of attachment means holding it on the rear terminal wall 7.

On its front side the cylinder barrel 23 of the cylinder housing 21 is closed off by a front terminal body 26, through which a piston rod 27 extends in a sealed manner, the inner end thereof being secured on a piston 28 which is axially guided for running in the interior of the cylinder barrel 23. The piston 28 divides up the external space of the cylinder barrel 23 into two working spaces 32 and 33 of variable volume, which on the opposite axial side are delimited by respective terminal bodies 24 and 26 in a sealing manner.

The overall axial length of the drive cylinder 22 is less than that of the housing 1. The front side, facing the front terminal wall 6, of the cylinder housing 21 ends axially within the front terminal wall 6 and in the example it ends in the bearing portion 13.

The output drive part 12, which in the embodiment is tubular, is designed in the form of a component separate from the cylinder housing 21 and the entire drive cylinder 22. It is arranged coaxially to the cylinder barrel 23 and slipped onto same from the front side axially so that it surrounds the cylinder barrel 23 for at least a part of its overall length. In this respect the output drive part 12 is able to be shifted axially in relation to the cylinder housing 21, which is solid with the housing, it extending to a larger or smaller extent past the front side of the cylinder housing 21 so that there is a corresponding change in the length of the outer section 14 of the length of the output drive part 12. The piston rod 27 emerging from the front terminal body 26 toward the front terminal wall 6, of the drive cylinder 22 extends into the outer space 34, placed axially in front of the cylinder housing 21, of the tubular output drive part 12 and extends forward as far as a point adjacent to the force output element 17, at which it is secured to the output drive part 12 jointly.

Each working space 32 and 33 of the drive cylinder 22 communicates with a connection port 35 and 36 provided for it, via which as required a fluid pressure medium and more particularly compressed air, may be supplied to the working spaces 32 and 33 and removed therefrom. Dependent on which working space 32 and 33 is supplied with pressure medium, the piston 28 will be moved in the one or the other direction axially, its motion being transmitted with the aid of the piston rod 27 to the output drive part 12 fixedly connected with same. In the course of the resulting axial movement of the output drive part 12 the same is, in the present example, exclusively guided by the bearing means 15. More particularly there is no transverse supporting action for the output drive part 12 on the cylinder housing 21 made up of the cylinder barrel 23 and the two terminal bodies 24 and 26. In the example there is a cylindrical annular gap 37 with the same length as the said section of the length, such gap being radially present between the cylinder housing 21 and the said section, surrounding same, of the length tubular output drive part 12. This leads to the advantage that the cylinder barrel 23 may be made with an extremely thin wall, because it does not have to perform any guiding function. The drive cylinder 22 is practically mounted at its rear terminal body 24 and its piston rod 27, which extends at the front side, in an exposed manner between the housing 1 and the output drive part 12 and does not need to resist any transverse forces.

Figure 1:
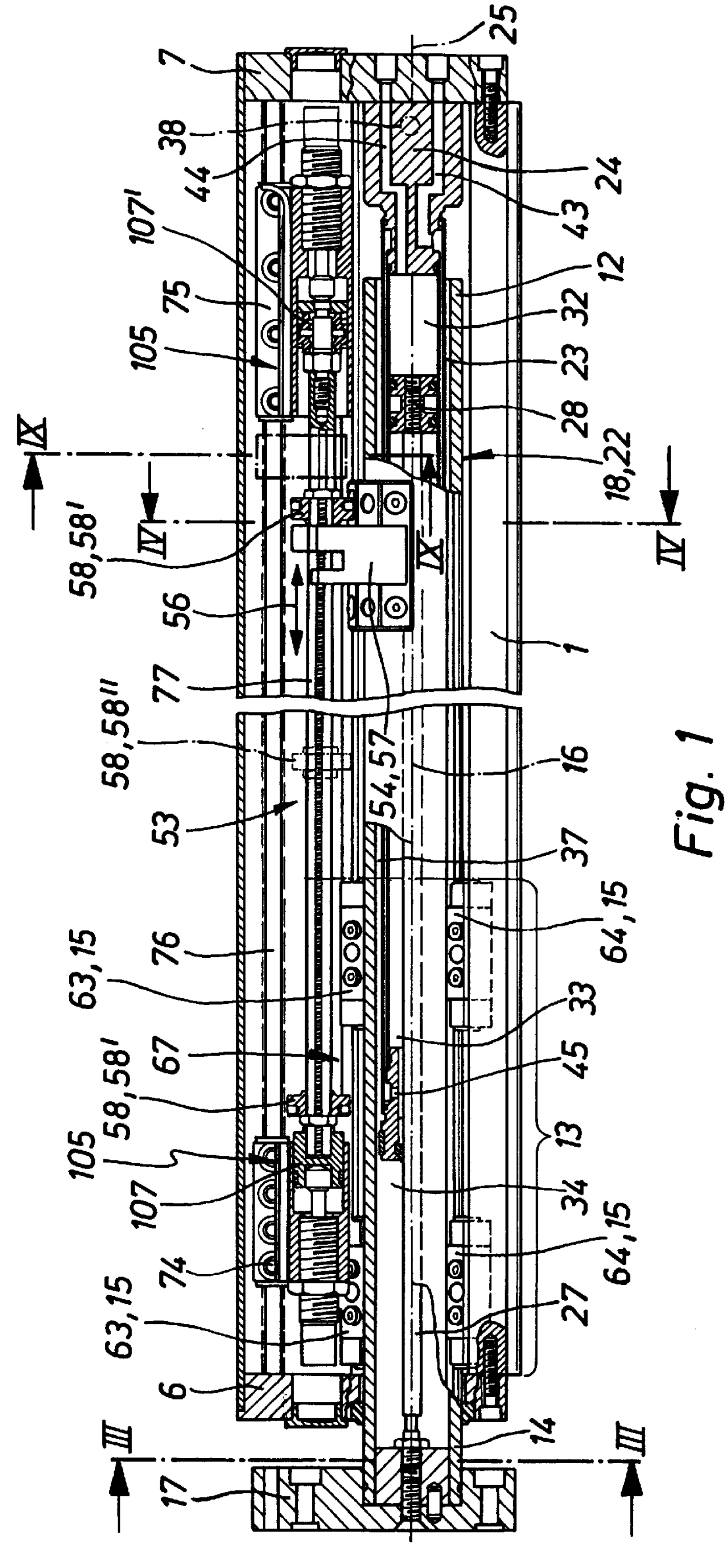
FIG. 1 shows a preferred design of the linear drive in accordance with the invention in a side view and partially in section or broken away.

The connection portion between the rear end of the drive cylinder 22 and the rear terminal wall 7 may in case of need be manufactured to be resilient to a limited extent and/or be adapted to be pivoted in order to automatically allow for errors in alignment, due to manufacture or assembly, of the longitudinal axes of the drive cylinder 22 and of the output drive part 12. FIG. 1 shows this diagrammatically by indicating a pivot axis 38 in chained lines.

Since the cylinder barrel 23 is not subjected to any transverse loading by the output drive part 12 it may with advantage be employed for transmission of the pressure medium required for the operation of the drive cylinder 22. For this purpose a connection duct 42 extends in the interior of the cylinder barrel 23 in the longitudinal direction thereof, such duct communicating with a first connection duct 43 at the rear side or end of the cylinder barrel 22 and extending through the rear connection body 24 and leading to the first connection port 35. At the front end of the cylinder barrel 23 the connection duct 42 is connected with a transfer duct 45, formed in the front connection body 26, and for its part the transfer duct 45 opens into the adjacent front working space 33. It is in this manner that the front working space 35 may be charged with compressed air through the purely static connection ducts, or be vented. Because at the periphery of the drive cylinder 22 no pressure medium ducts are necessary, which would otherwise interfere, all in all extremely compact transverse dimensions of the linear drive are possible.

It is convenient for the second connection port 36 to be located in the vicinity of the first connection port 35 and more especially on the rear terminal wall 7. It communicates with a second connection port 44 also extending through the rear terminal body 24, such second connection duct 44 opening into the directly adjacent working space 32. It is in this manner that fluid control and drive of the linear drive is made possible from a central point.

In order to be able to design a cylinder barrel 23 having a minimum wall thickness while still providing a maximum flow cross section in the connection duct 42, the connection duct 42 is in the example designed in the form of an annular duct 46 arranged concentrically in the internal space 32 and 33 or bore in the cylinder barrel 23, such annular duct 46 having an annular cross section as may be seen from FIG. 4. The radial dimensions of this annular duct can be minimized, because due to the large size of the periphery there is a sufficiently large flow cross section.

It is convenient for the annular duct 46, as in the illustrated embodiment of the invention, to be composed of an inner tube 47 of small diameter and a coaxial outer tube 48 surrounding the inner tube 47 with a clearance all the way around. The inner tube 47 delimits the working spaces 32 and 33 and constitutes the running face for the piston 28 and the surrounding intermediate space between the two tubes 47 and 48 constitutes the annular duct 46. The concentric alignment of the two tubes 47 and 48 is ensured by suitable attachment to concentrically set back attachment sections 51 and 52 on the two connection bodies 24 and 26 so that in the interior of the annular duct 46 there are no obstructions to flow.

The linear drive is preferably provided with a position preset means 53, which extends in the housing to the side adjacent to the output drive part 12 and, respectively, the drive cylinder 22. It cooperates with a position preset element 54, which in a part of the output drive part 12 is secured to same for ganged movement therewith, such part being located axially within the housing 1 independently of the axial position of the output drive part 12. In the embodiment it is axially clear of both ends of the output drive part 12 on the outer periphery of the output drive part 12. It is convention for it to be located in the vicinity of the inner end of the output drive part 12. It extends laterally from the output drive part 12 and in a receiving space 55, termed in the following the position preset space, arranged adjacent to the output drive part 12 and the drive cylinder 22, the position preset means 53 being arranged in such receiving space. If the output drive part 12 is shifted axially, the position preset element 54 will be displaced as indicated by the double arrow 56 in the longitudinal direction of the position preset space 55.

Owing to cooperation with the position preset element 54 the position preset means 53 is able to preset different axial positions of the output drive part 12. It is in this manner that the output drive part 12 may be positioned during its operation as required in preset positions.

In order to render possible simple and at the same time reliable positioning of the position preset element 54 is in the example designed in the form of an abutment body, herein termed an abutment 57, extending away from the output drive part 12 in the transverse direction. It is able to cooperate with one or more counter-abutments 58, same being components of the position preset means 53 secured in relation to the housing. Should the abutment 57 strike one of the counter-abutments 58 set on its path 56 of travel, the motion of the output drive part 12 will be arrested.

In order to ensure a minimum overall length of the housing 1 while at the same time having a large positioning range and a firm means for supporting the output drive part 12, the arrangement in the embodiment herein is such that the position preset space 55, wherein the abutment 57 moves along, extends from the rear side of the housing 1 into the bearing portion 13 axially. This means that the abutment 57 may run past the bearing means 15 without being hindered by same. The range of movement of the abutment 57 and the bearing portion 13 consequently overlap each other in the axial direction with the result that a foreshortened overall length is possible.

This is rendered possible because the bearing means 15 extends at least along a section of its overall length and preferably—as in the working embodiment—along the entire length of the bearing portion 13, only over part of the periphery of the output drive part 12. The output drive part 12 is hence not completely surrounded by the bearing means 15 and there is only a bearing function in a certain part. In the illustrated working embodiment the bearing function is limited to two diametrally opposite parts of the outer periphery of the output drive part 12, such parts appearing in cross section as being restricted to points. The corresponding bearing portions are referenced 62 in FIGS. 4 and 5. The bearing means 15 in this case comprises two pairs, following each other in the longitudinal direction of the output drive part 12, of diametrally opposite and more particularly cassette-like bearing units 63 and 64, which in the bearing portions 62 rest on the outer face of the output drive part 12 so that same is guided for axial sliding movement and at the same time is supported in the transverse direction. Since the two pairs of bearing units 63 and 64 are arranged with an axial distance between them, there is a transverse supporting action distributed along a considerable length, something which results in an extremely precise and sturdy guiding action for the output drive part 12.

The number of bearing units 63 and 64 is basically freely selectable. It would for example be possible to have only one pair of bearing units 63 and 64, if there were a sufficient length. The bearing units 63 and 64 may as desired be in the form of plain bearings or anti-friction bearings and more particularly in the form of bearings with recirculating balls or rollers.

The bearing means 15 conveniently at the same time constitute a means for preventing rotation of the output drive part 12. For this purpose in the embodiment there is a provision such that the output drive part 12 possesses a longitudinally extending guide groove 61 in its bearing portions 62, such groove being machined into its outer periphery and having the associated bearing units 63 and 64 interlocking with it. This latter feature is made clear in FIG. 4.

The bearing units 63 and 64 extend respectively only over a part of the periphery of the output drive part 12. This means that there are two sections 65 and 66 of the periphery of the output drive part 12, which do not cooperate with the bearing means 15. Along one of these sections of the periphery 65 the output drive part 12 is exposed or uncovered in the bearing portion 13 with the result that laterally to the side of the output drive part 12 there is a free space 67 extending in the longitudinal direction and simultaneously in the circumferential direction. Such free space is so aligned that it lies in the path 56 of travel of the abutment 57 and accordingly constitutes a part of the position preset space 55. Its peripheral extent is in the working example of the order of 180° and, owing to the overall width of the bearing units 63 and 64, is somewhat less than 180°.

Figure 2:
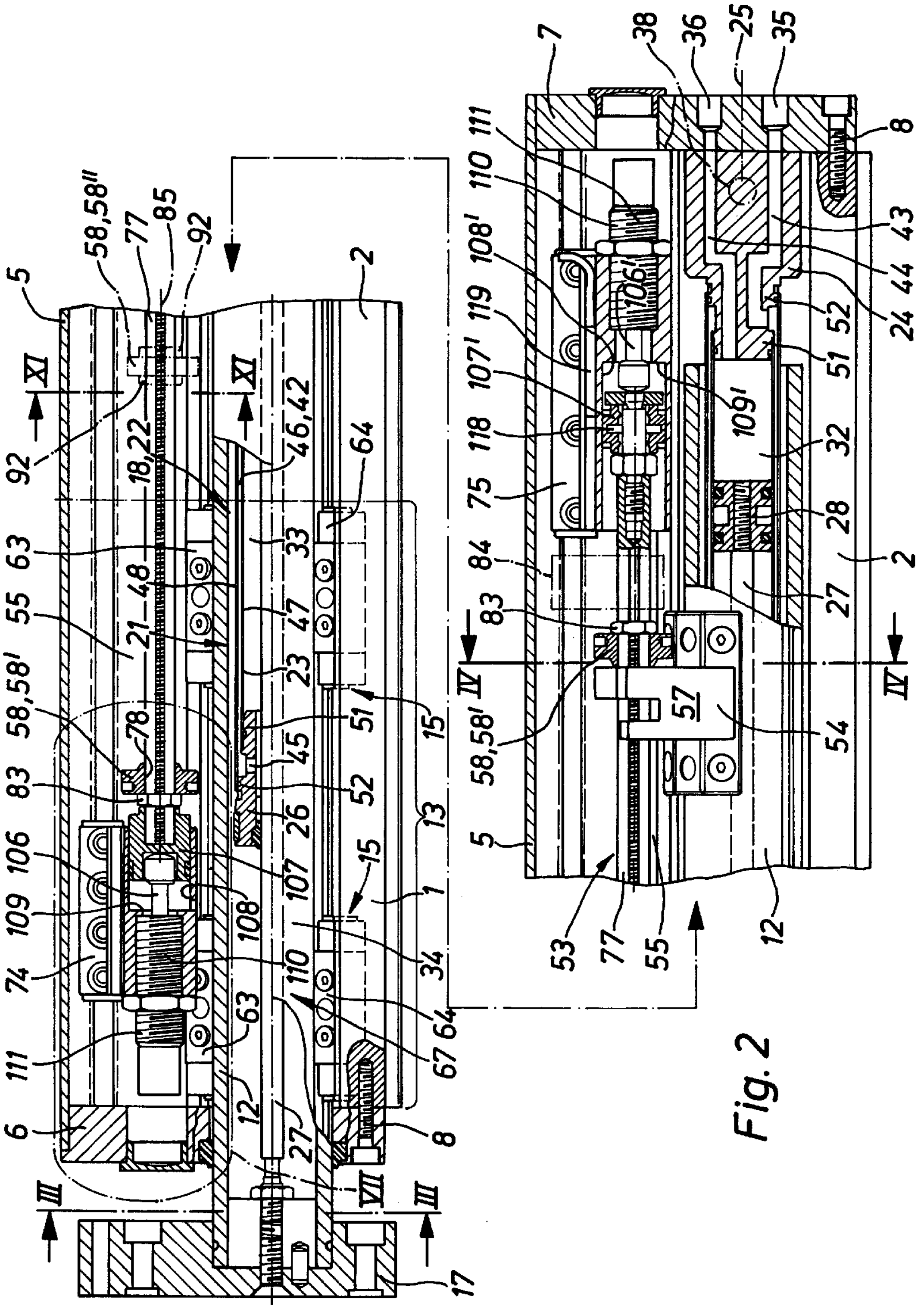
FIG. 2 shows the two terminal sections of the linear drive of FIG. 1 on a larger scale.
Figure 3:
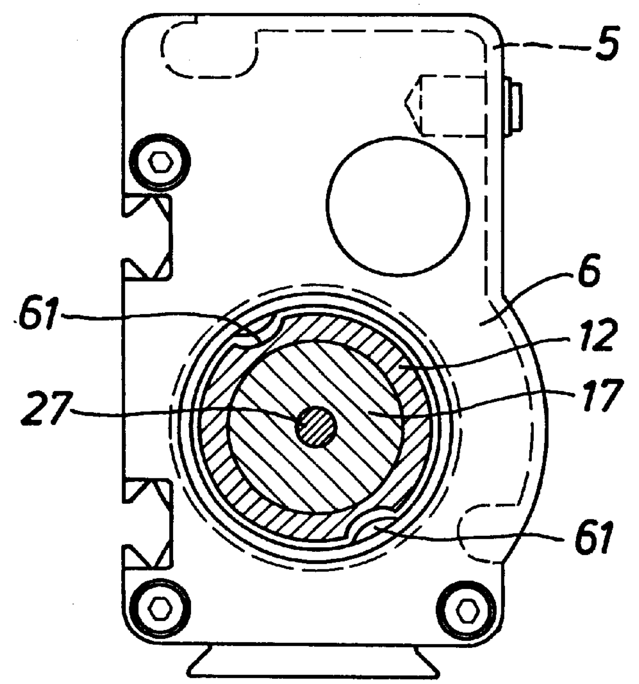
FIG. 3 shows the linear drive in accordance with FIGS. 1 and 2 in cross section taken on the line III—III.
Figure 5:
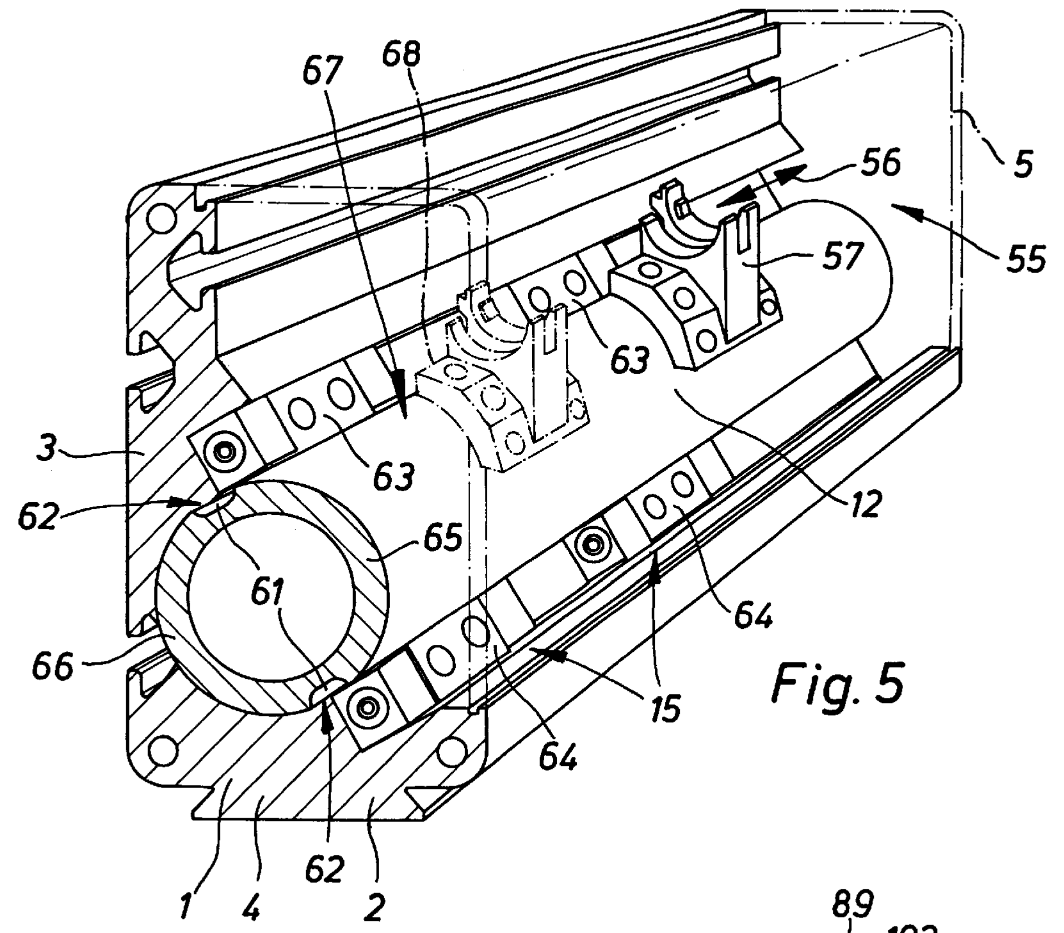
FIG. 5 shows a perspective view of part of the linear drive, the bearing portion being visible and the position preset means not being illustrated in detail.

When the output drive part 12 is located in the retracted position indicated in FIGS. 1 and 2, wherein it surrounds the drive cylinder 22 for preferably its entire length, the abutment 57 will be in the interior of the housing 1 axially spaced from the bearing portion 13. It is however able to moved into the above mentioned free space 67 when the output drive part 12 is moving outward, it laterally moving past the bearing means 15. The position of the abutment 57 is indicated in FIG. 5 in chained lines at 68 when it is moved into the free space 67.

As measured in the direction as considered in the plane extending through the output drive part 12 and the position preset space 55 the overall width of the housing 1 is larger than in the direction at a right angle thereto. The corresponding alignment is therefore spoken of as the vertical axis 72 and the alignment extending at a right angle thereto is termed the transverse axis 73. In order to make the best possible use of this cross sectional form for the accommodation of the free space 67, the free space 67 is preferably so placed in relation to the transverse and vertical axis 73 and 72 that it is obliquely aligned, the uncovered section 65 of the periphery of the output drive part 12 facing obliquely to the side in the transverse direction and simultaneously in the vertical direction downward or upward. In order to design with this constructional form the main body 2, at least in the bearing portions 62, possesses the above mentioned L-like cross sectional shape, its two L limbs 3 and 4 covering the one peripheral section 66 of the output drive part 12—preferably without having to perform any guide function—and an exposed section 65 of the periphery is left, which has the free space 67 associated with it.

The free space 67, as in fact like the entire position preset space 55, could, as a matter of principle, be open to the side. In order to avoid injury, it is convenient to provide for a covering function by the above mentioned covering body 5.

The position preset means 53 provided in the embodiment of the invention extends over approximately all the length of the housing between the front and the rear terminal wall 6 and 7. It comprises two holders 74 and 75 arranged adjacent to the terminal walls 6 and 7, such holders being set more particularly on the inner face of the longer L-like limb 3. For attachment the main body 2 may have at least one longitudinally extending anchoring groove 76, on which the holders 74 and 75 may be anchored in an axially adjustable manner using commercially available anchoring runners.

The two holders 74 and 75 bear a holding rod 77 extending between them and aligned with the longitudinal axis 16 of the output drive part 12. On the holding rod 77 a plurality of the above mentioned counter-abutments 58 are mounted at an axial distance apart in a manner preventing rotation thereof. In the example two terminal counter-abutment 58', arranged in the vicinity of one of the two holders 74 and 75 and furthermore an intermediate counter-abutment 58" are provided. The abutment 57 extends as far as the holding rod 77, which it at least partly fits round, this being indicated in FIGS. 11 and 12. In this case the abutment 57 extends into the axial intermediate space between the two terminal counter-abutments 58', which are so arranged and designed that they are always in the path 56 of travel of the abutment 57. They serve to preset the terminal positions of the output drive part 12, the abutment 57 being shown in FIG. 1 as having run onto the rear terminal counter-abutment 58' in the terminal position reached on moving into the terminal position, while in the case of reaching the terminal position by moving out (not illustrated) it runs onto the front terminal counter-abutment 58'.

The terminal counter-abutments 58' are mounted on the holding rod 77 so that they may be adjusted and refixed in the longitudinal direction and there is a more particularly stepless possibility of adjustment for the terminal positions. For this purpose the holding rod 77 may be designed in the form of a lead screw, on which the counter-abutments 58 are screwed with a complementary female screw means 78 with the result that they may be shifted axially by screwing and on reaching the desired point may be detachably set using a lock nut.

The counter-abutment 58" additionally provided in the working example additionally renders possible the presetting of an intermediate position of the output drive part 12 as required. This intermediate position may be set as required as a preliminary, if the intermediate counter-abutment 58" for example is able to be adjusted in the axial direction in a manner comparable with the terminal counter-abutment 58'.

Figure 11:
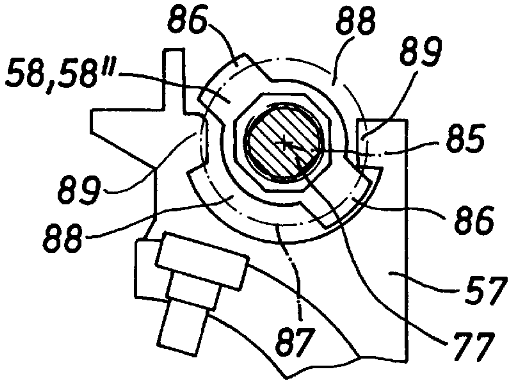
FIG. 11 shows a cross section through part of the linear drive at a switching counter-abutment, indicated in chained lines and diagrammatically in FIGS. 1 and 2, on the line XI—XI, the counter-abutment being in an inactive setting corresponding to the first angular setting as in FIG. 9.
Figure 12:
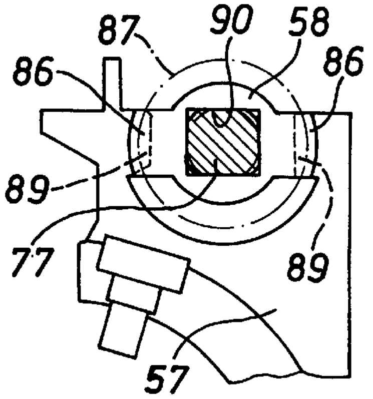
FIG. 12 shows the arrangement of FIG. 11 with the counter-abutment moved into the active position, which corresponds to the second angular position of FIG. 10, of the holding rod.

Unlike the terminal counter-abutment 58 and 58', which are essentially like disks in form and are seated coaxially on the holding rod 77, the intermediate counter-abutment 58" has a shape which is not symmetrical in relation to the longitudinal axis 85 of the holding rod 77 and particularly is not radially symmetrical. A possible design by way of example is illustrated in FIGS. 11 and 12. This configuration renders it possible to change over between an active position (FIG. 12) extending into the path 56 of travel of the abutment 57 and an inactive position (FIG. 11) outside the path 56 of travel of the abutment 57. The switching over operation is in the example performed by a switching over means 84, which cooperates with the holding rod 77 and is able to turn the latter about its longitudinal axis 85 into preselected angular positions and to set it in such position. Dependent on which switching position is set, it is possible for the abutment 57 to move past the intermediate counter-abutment 58 and 58" without hindrance or to be halted by it so that the output drive part 12 is halted in an intermediate position.

In the embodiment of the invention the intermediate counter-abutment 58" is slipped coaxially on the holding rod 77, but however in its outline departs from the form of a disk or from a radially symmetrical shape. It does for instance have two diametrally opposite counter-abutment regions 86 on a common imaginary circle 87, such regions more particularly extending to the outside like wings. The intermediate portions 88 placed between the counter-abutment region 86 are free.

For adaptation to this configuration the section, partially extending around the holding rod 77, of the abutment 57 is provided with two abutment regions 89, which are also diametrally opposite as related to the longitudinal axis 85 of the holding rod 77, and which extend into the periphery 87 centered of the longitudinal axis 85. The remaining intermediate portions lying of the periphery 87 between the abutment portions 89 are free. Preferably the abutment portions 89 are adjacent to the free end of a section, surrounding the holding rod 77 like a fork, of the abutment 57.

In the inactive position the intermediate counter-abutment 58" has been moved into such an angular position that its counter-abutment portions 86 are outside the axial path of travel of the abutment portions 89. In order to set in the active position, the intermediate counter-abutment 58 and 58" is turned using the switching over means 84 until its counter-abutment portions 86 are, as seen in FIG. 12, in the path of axial movement of the abutment portions 89 provided on the abutment 57.

Because the counter-abutment portions 86 and the abutment portions 89 are arranged opposite to each other as related to the longitudinal axis of the holding rod 77, there is on impact a centered transfer of force to the holding rod 77, something which extends the length of the working life of the individual components.

In order to ensure a reliable rotational locking of the intermediate counter-abutment 58 and 58' on the holding rod 77 it is possible, as a modification of the above mentioned embodiment, to provide a special type of attachment. Thus in the example the holding rod 77 designed in the form of a lead screw, has a square cross section as indicated in FIGS.

11 and 12, only the corner parts having threads so that the terminal counter-abutments 58' and the lock nuts 83 therefor may be screwed together without any trouble. On the contrary the intermediate counter-abutment 58" possesses a central square opening 90 corresponding in cross section to the holding rod 77, permitting the counter-abutment 58" to be slipped in an axially sliding manner, while at the same time being rotationally locked, on the holding rod 77. Axially to either side of the intermediate counter-abutment 58 and 58' it is then convenient to provide a respective attachment nut 92 so that the intermediate counter-abutment 58" may be held tight at the desired axial position.

Figure 9:
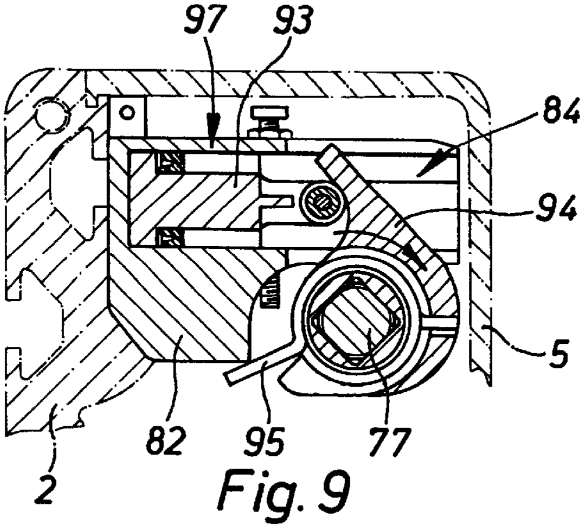
FIG. 9 shows part of a cross section taken through the linear drive adjacent to the switch-over means, only indicated in chained lines diagrammatically, on the line IX—IX, the holding rod having assumed a first angular setting.
Figure 10:
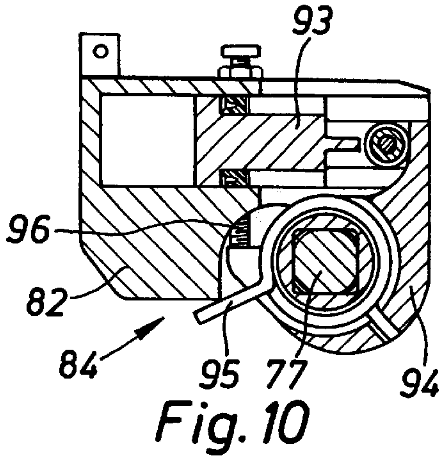
FIG. 10 shows the switch-over means of FIG. 9 in the actuated state, the holding rod being positioned in a second angular setting.

In the case of the embodiment described by means of the switching over means 85 the holding rod 77 can be positioned in two different angular settings, which correspond to the active and in active setting of the intermediate counter-abutment 58 and 58'. A switching over means 84 suitable for this purpose is indicated diagrammatically in FIGS. 9 and 10. It comprises a holding body 82, via which it is attached to the main body 2 of the housing 1, for example at the anchoring nut 76. On the holding body 82 a force applying means 97 is arranged having a force applying element 93, the latter cooperating with a switching latch 94 rotationally locked with the holding rod 77. By means of a spring means 95 the switching latch 94 is biased into an initial setting, in which the holding rod 77 assumes an angular position corresponding to the inactive setting (FIG. 9). By operation of the force applying element 93 the switching latch 94 is turned against the force of the spring means until it assumes the actuated position indicated in FIG. 10, in which the holding rod 77 is shifted into an angular position corresponding to the active setting of the intermediate counter-abutment 58 and 58'. For adjustably presetting the actuated position of the switching latch 94 it is appropriate to provide an adjustment element 96, which in the embodiment is constituted by a screw. During the following de-activation of the force applying element 93 the switching latch 94 is swung back into the initial position by the spring means 95.

In the illustrated working embodiment the force applying element 93 is a component of a fluid operated force applying means, for instance in the form of a drive cylinder. Here it would however be possible to conceive of any other possible type of actuation, as for example an electrical actuating means. It would also be possible to do without a return spring, if a double acting actuating means were provided for the force applying element 93.

Figure 13:
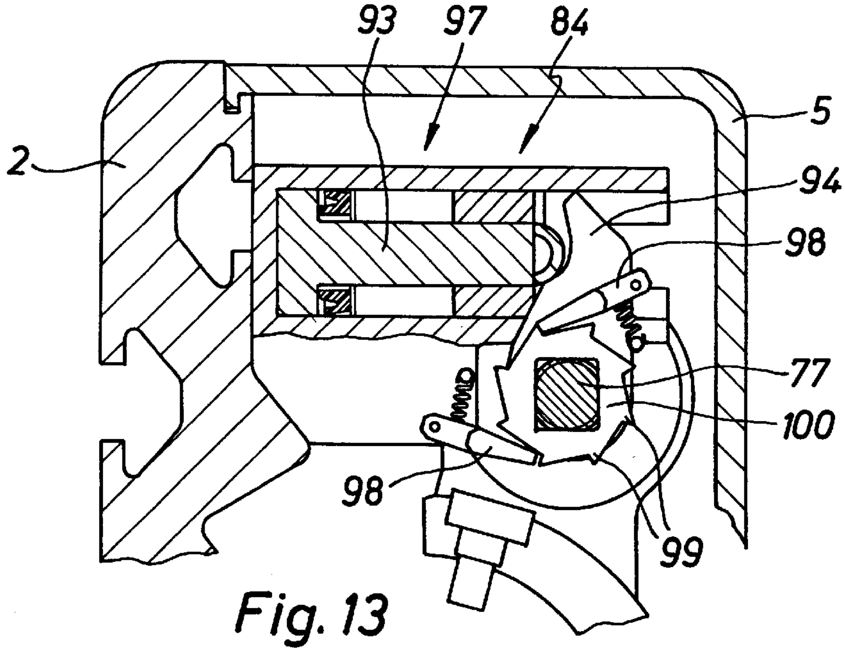
FIG. 13 diagrammatically shows a view, corresponding to FIG. 9, of a further embodiment of a switch-over means, which permits a positioning in steps of the holding rod into more than two different angular positions.

It would also be perfectly possible to provide a plurality of intermediate counter-abutments 58 and 58' on the holding rod, of which one respective counter-abutment could in case of need be switched into the active position in order to preset a greater number of intermediate positions. In this respect it would also be advantageous to design the switching over means 84, for example in accordance with the configuration illustrated in FIG. 13, as a step drive, with which the holding rod 77 could be set in more than two predetermined angular positions by rotation in steps.

In the case of the switching over means 84 as illustrated in FIG. 13 there is again the provision of a force applying means 97 provided with a force applying element 93, such means 97 cooperating with a switching latch 94 associated with the holding rod 77. Once again the switching latch 94 is urged by a spring means 95, not illustrated, into the depicted initial position. Unlike the configuration illustrated in FIGS. 9 and 10 the switching latch 94 is however arranged freely rotatably on the holding rod 77 and provided with at least one or more moving detent latches 98, which may cooperate with detent portions 99, distributed in the peripheral direction, of a switching body 100 connected in a rotationally locked manner on the holding rod 77. If the switching latch 94 is deflected into its actuated position, the detent latches 98 will come into detent engagement with the detent portion 99 coming next in the peripheral direction so that with the switching latch 94 turning back into the initial position, the switching body 100 will be moved on further through one angular step together with the holding rod 77.

Figure 6:
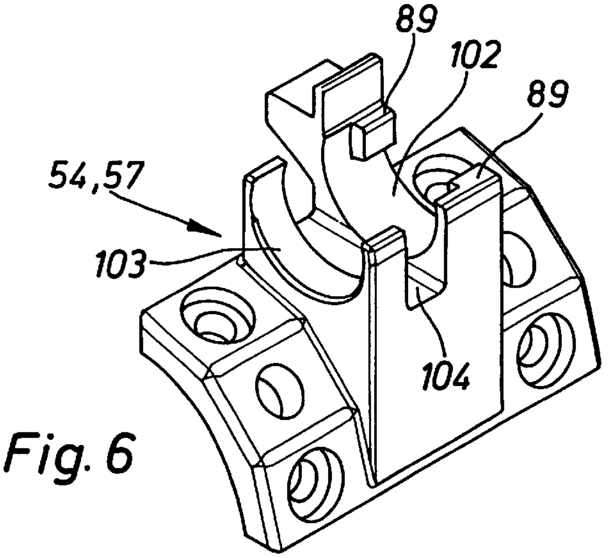
FIG. 6 is a separate view of the position preset element employed in the linear drive and designed in the form of an abutment.

FIG. 6 shows an abutment 57 having a preferred design by itself. The reader will see the fork-like section 102 with the two abutment portions 89 provided thereon. It is convenient to provide a further fork portion 103 placed in front of and at a distance from the front terminal counter-abutment 58 and 58'. On reaching the inner terminal position of the output drive part 12 the rear fork-like section 102 of the abutment 57 will run onto the inner end counter-abutment 58 and 58', whereas on reaching the outer end position its fork portion 103 will run onto the front end counter-abutment 58 and 58'. There is now the possibility of putting a single intermediate counter-abutment 58" out of operation by screwing same tightly against the front counter-abutment 58 and 58'. The abutment 57 is then able to be moved so that its fork portion 103 runs onto the front end counter-abutment 58 and 58', the intermediate counter-abutment 58 and 58' running into the fork recesses without taking effect. The slot-like intermediate space 104 facilitates the accessibility of the one attachment nut 92, when the abutment 58 is put on the intermediate counter-abutment 58" for adjustment purposes.

In order to deaden the impact of the abutment 57 on the counter-abutments 58, the position preset means 53 is preferably provided with a shock absorber means 105. It comprises at least one and in the example two moving damping members 106 and 106', with which the holding rod 77 is kinematically coupled axially. The shock absorber means 105 is hence associated with all counter-abutments 58 in common, with which it cooperates via the holding rod 77.

As regards details it will be seen that the holding rod 77 is mounted on the housing 1 via the shock absorber means 105 for motion to a limited extent axially along a path termed the damping path s. This is made possible in the embodiment because at both ends of the holding rod guide members 107 and 107' are provided which are preferably designed like pistons, by means of which the holding rod 77 is guided axially for sliding motion in guides 108 and 108' provided on the holders 74 and 75. Each respective guide member 107 and 107' at the same time constitutes an abutment element, axially opposite to which, at a distance corresponding to the damping path s, a stroke limiting portion 109 and 109' is arranged which is provided on the associated holder 74 and 75.

Figure 7:
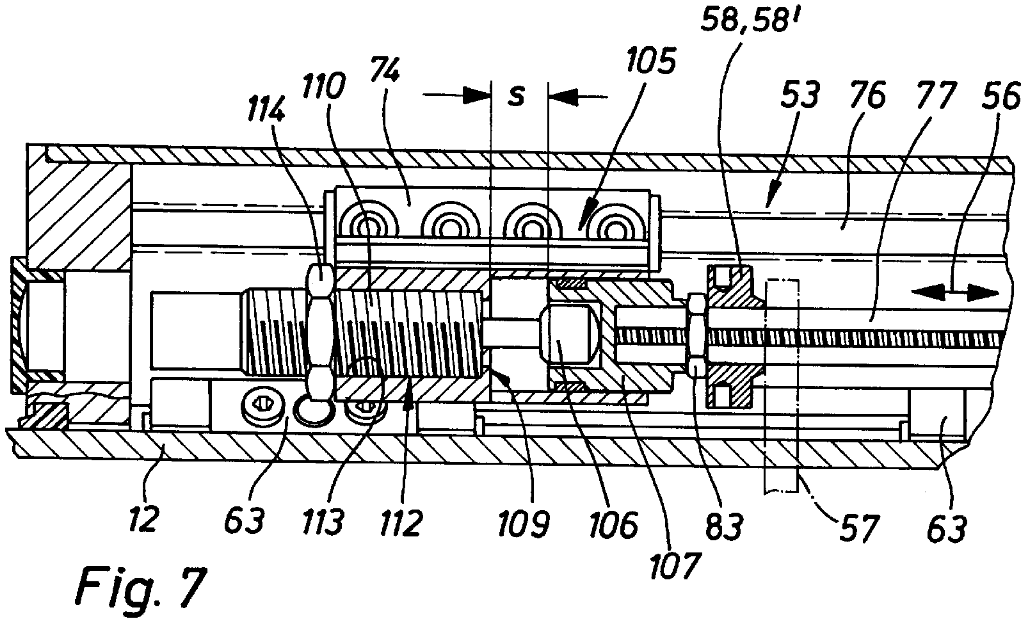
FIG. 7 shows the portion marked VII in FIG. 2 on a larger scale in order to make clear the action of the shock absorber means, the holding rod being illustrated in its home setting.
Figure 8:
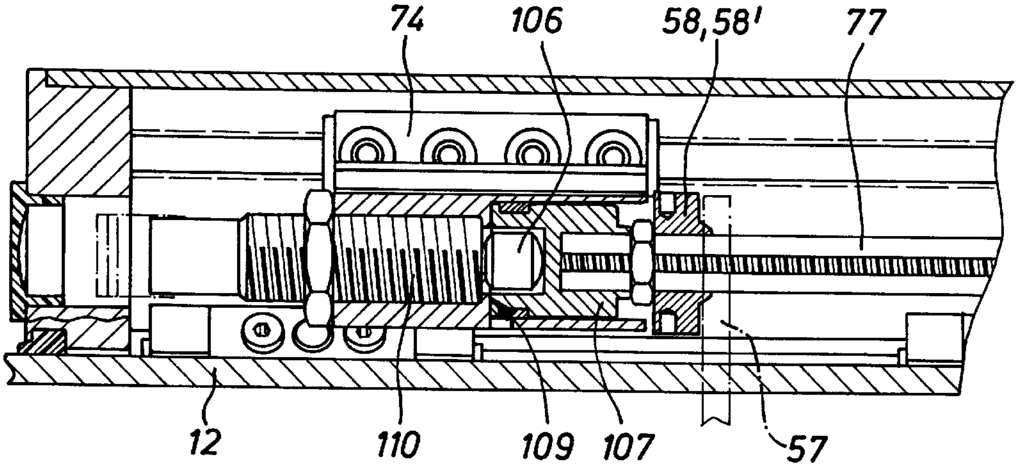
FIG. 8 shows the arrangement of FIG. 7 with the terminal position assumed by the holding rod after moving along the damping path.

Normally the holding rod 77 will assume a home position, at which its guide members 107 and 107' are spaced apart from both stroke limiting portions 109 and 109' by the damping path s. This is shown in FIGS. 1, 2 and 7. This home position is stabilized by the above mentioned damping members 106 and 106' of two fluid-type shock absorbers 110, which are arranged on either side of the holding rod 77 as an extension thereof. They are so attached by means of their damper housing 11 on the respective holder 74 and 75 that their damping member 106 and 106' is turned toward the holding rod 77 and acts on same with a resilient loading action. This means that the holding rod 77 is stabilized in its home position axially. This biasing force is caused by a spring means, not illustrated, which is accommodated in the associated damper housing 111. The damping members 106 and 106' are constituted by plungers extending away from the damper housing 111 and on which the in the damper housing 111 a damping piston is arranged, each damping member 106 and 106' being able to be shifted toward the damper housing 111 with the displacement of damping fluid. Shock absorbers of this type, be they gas shock absorbers, hydraulic shock absorbers or hybrid shock absorbers are known as such so that a more detailed description thereof is unnecessary here.

If when the holding rod 77 is in its home position the abutment 57 strikes against one of the counter-abutments 58 (this instant being illustrated in FIG. 7), the respective counter-abutment 58 will be displaced together with the holding rod 77 by the impact along the damping path s until the guide member 107, which is to the fore in the direction of motion, runs up against the associated stroke limiting portion 109 and the holding rod 77 accordingly reaches a terminal position. Since then the associated damping member 106 is displaced, there is a shock absorbing action, in which the energy of the impact is reduced to a commensurate level.

The individual counter-abutments 58 are preferably so set here that same exactly assume the desired position preset positions, when the holding rod 77 has reached the end position at the end of the damping operation.

In order to be able to adjustably set the intensity of damping without affecting the end position of the holding rod 77 and accordingly the position preset settings of the counter-abutments, the damping path s is preferably permanently set. The path limiting portions 109 and 109' are arranged separately from the respective shock absorber 110 on the associated holder 74 and 75. On the contrary the shock absorbers 110 are mounted on the associated holder 74 and 75, the axial distance apart of the damper housing 111 and the associated stroke limiting portion 109 and 109' being able to be reset. The possibility of adjustment is preferably ensured by a screw connection. In the example the damper housings 11 are provided with an external screw thread allowing them to be screwed a predetermined degree of insertion into a holding recess 113 provided with an internal screw thread. A lock not can be provided for fixing the position set.

In order to render possible the detection of predetermined axial positions of the holding rod 77, it is convenient to provide at least one guide member 107' with an actuating element 118, for example with a permanent magnet, for which at least one sensor 119 is provided, which is located at the outer periphery of the associated guide 108'.

What is claimed is:

1. A linear drive comprising a rod-like rotationally locked output drive part guided for axial movement in relation to a housing using a bearing means cooperating with its outer periphery, said bearing means being provided in a bearing portion of said housing, at least one position preset element provided on the output drive part, such preset element being shifted on axial movement of the output drive part along a position preset space, wherein the bearing means extends around part of the periphery of the output drive part such that the output drive part is exposed in the bearing portion along a section of the periphery not cooperating with the bearing means so that in the bearing portion to the side adjacent to the output drive part there is a free space extending in its longitudinal and peripheral direction, such free space allowing for motion of the position preset element in the bearing portion, the housing further including a main body with an L-like cross section, said body carrying the bearing means.

2. The linear drive as claimed in claim 1, wherein the main body with a cross section like a letter L has a cover body placed thereon detachably with an L-like cross section so that as seen in cross section the outer shape of the housing is essentially like that of a rectangle.

3. The linear drive as claimed in claim 1, wherein the free space extends at least approximately along the entire length of the bearing portion.

4. The linear drive as claimed in claim 1, wherein the peripheral extent of the free space generally is in a range of the order of 180°, it preferably amounting to somewhat less than 180°.

5. The linear drive as claimed in claim 1, wherein the bearing means is constituted by at least two bearing units respectively extending over only part of the periphery of the output drive part, such bearing units cooperating on diametrally opposite sides with the outer periphery of the output drive part.

6. The linear drive as claimed in claim 1, wherein the bearing means simultaneously constitutes a means for ensuring rotational locking for the output drive part.

7. The linear drive as claimed in claim 1, wherein the free space is so placed in relation to the transverse and vertical axis as seen in a transverse section, that it is aligned obliquely, the exposed peripheral section of the output drive part facing obliquely to the side and at the same time in the vertical direction.

8. The linear drive as claimed in claim 1, wherein at least at one end face the output drive part emerges from the housing, the bearing portion being provided in the end section associated with this end face of the housing.

9. The linear drive as claimed in claim 1, wherein the output drive part is designed so as to be tubular.

10. The linear drive as claimed in claim 1, wherein the position preset element is arranged at an axial distance from the two ends of the output drive part on the external periphery of the output drive part.

11. The linear drive as claimed in claim 1, wherein the position preset element cooperates with a position preset means arranged in the position preset space.

12. The linear drive as claimed in claim 5, wherein the bearing means possesses a plurality of pairs of diametrally opposite bearing units, which are arranged in axial alignment in sequence.

13. The linear drive as claimed in claim 5, wherein in the portions of its periphery cooperating with the bearing units, the output drive part possesses at least one longitudinally extending guide groove, into which the associated bearing unit fits for rotational locking of the output drive part.

14. The linear drive as claimed in claim 11, wherein the position preset element is designed in the form of an abutment adapted to be moved with the output drive part, at least one counter-abutment of the position preset means being provided at the position preset space in the path of the movement of the abutment.

15. The linear drive as claimed in claim 14, wherein a holding rod of the position preset means extends in the output drive space alongside the output drive part, at least one counter-abutment being arranged on the holding rod, more particularly in a longitudinally adjustable fashion.

16. The linear drive as claimed in claim 15, wherein the abutment provided on the output drive part at least partially extends around the holding rod of the position preset means.

17. The linear drive as claimed in claim 16, wherein the holding rod is partially encompassed by a fork-like section of the abutment.

18. The linear drive as claimed in claim 14, wherein the position preset means possesses at least one counter-abutment, which is able to be switched over between an active position extending into the path of travel of the abutment and an inactive position located outside the path of travel of the abutment.

19. The linear drive as claimed in claim 15, wherein the at least one counter-abutment is arranged on the holding rod in a rotationally locked manner, and a switching over means cooperates with the holding rod for turning same about its longitudinal axis for switching over the at least one counter-abutment between an active position extending into the path of travel of the abutment and an inactive position located outside the path of travel of the abutment.

20. The linear drive as claimed in claim 19, wherein the holding rod is able to be positioned by the switching over means in at least two different angular positions.

21. The linear drive as claimed in claim 19, wherein the switching over means is designed in the form of a step drive, with which the holding rod may be positioned in preferably more than two predetermined different angular settings by rotation in steps.

22. The linear drive as claimed in claim 19, wherein the position preset means possesses two external end counter-abutments for setting the end position of the position preset means, such end counter-abutments being so designed that independently of the angular position of the holding rod they assume their active position, at least one switching intermediate counter-abutment being provided axially between such end counter-abutments.

23. The linear drive as claimed in claim 18, wherein the switching counter-abutment possesses counter-abutment portions projecting in a wing-like fashion and adapted to cooperate with the abutment.

24. The linear drive as claimed in claim 15, wherein the position preset means possesses a shock absorber means, which has at least one moving damping member, with which the holding rod, which is mounted for axial displacement, is kinematically coupled.

25. The linear drive as claimed in claim 24, wherein starting in a home position, the holding rod is able to be deflected in at least one axial direction through a predetermined damping path until it reaches a predetermined end position, such deflection being accompanied by displacement in the at least one damping member.

26. The linear drive as claimed in claim 25, wherein the end position of the holding rod is permanently set independently of the maximum possible damping stroke of the damping member of the shock absorber means.

27. The linear drive as claimed in claim 24, wherein the shock absorber means possesses at least two shock absorbers having the damping members, the damping effects thereof being axially oppositely directed in relation to the holding rod.

28. The linear drive as claimed in claim 27, wherein the at least two shock absorbers are provided for axially opposite end portions of the holding rod, such shock absorbers preferably being in an axial extension of the holding rod and each being fixed more particularly on a holder locked to the housing.

29. The linear drive as claimed in claim 24, wherein the holding rod is mounted in a sliding fashion, more particularly by means of piston-like guide members, at least one of such guide members possibly having an actuating element cooperating with a position sensor.

* * * * *